United States Patent Office 3,076,858
Patented Feb. 5, 1963

3,076,858
SELECTIVE HYDROGENATION IN THE PRESENCE OF COPPER CATALYSTS
Ludo K. Frevel, Midland, and Leonard J. Kressley, Saginaw, Mich., assignors to The Dow Chemical Company, Midland, Mich., a corporation of Delaware
No Drawing. Filed June 16, 1958, Ser. No. 742,060
4 Claims. (Cl. 260—677)

This invention concerns selective vapor phase hydrogenation procedures and copper catalysts useful therein.

Catalysts consisting of a preponderance of finely divided copper together with a minor proportion of another finely divided metal which is also a hydrogenation catalyst, carried on an inert siliceous support are known. These catalysts consist essentially of 85 to 99.9 weight percent of copper and 15 to 0.1 percent of a metal such as Ti, V, Cr, Mn, Co, Ni, Zn, Mo, Ag, and Cd or mixtures thereof. Carriers therefor are of the low surface area siliceous types, ca. 5 sq. meters/g.

Such catalysts have been found to be of limited value because they can be used for selective vapor phase hydrogenations only at low space velocities, 150–200 reciprocal hours, S.T.P., now commerically unattractive, at temperatures between 100° and 250° C. Their active catalyst surface area corresponds to less than 0.1 ml. CO chemisorbed per g. of catalyst.

It has now been discovered that novel copper catalysts, particularly useful in selectively hydrogenating mixed $C_4$- or $C_3$-hydrocarbon vapors containing 1,3-diolefines, 1,2-diolefines, acetylene and its homologs, vinylacetylene, propadiene and propylene or butenes, can be made which consist of 99.9 to 99.999 weight percent of finely divided copper together with a balance of one or more finely divided promoter metals such as Fe, Ni, Ru, Rh, Pd, Pt and Ir. The catalysts are supported on a high surface area (50–300 sq. meters/g.) alumina carrier, i.e., activated gamma or kappa aluminas or mixtures thereof, giving a catalyst having an active catalyst surface area corresponding to at least 1 ml. CO chemisorbed per g. of catalyst. The finished catalyst is generally prepared to contain from about 5 to 20 weight percent of mixed metals but greater or lesser proportions can be used. These catalysts now make possible commercially attractive space velocities of 500 hr.$^{-1}$ or greater.

The supported catalyst is ordinarily prepared by immersing the supporting alumina in an aqueous solution of the salts of the metals of which the catalyst is to be composed, then removing and drying the supporting alumina, heating it in air to convert the metal salts into the corresponding oxides, and reducing the latter with hydrogen. The step of roasting to convert the metal salts to oxides is usually accomplished at temperatures between 350° and 550° C. preferably at about 400° C., but it can be carried out at somewhat lower or at higher temperatures. Reduction of the metal oxides is carried out at temperatures below 550° C. and usually between 250° and 350° C. The reduction step also can be accomplished at somewhat lower or higher temperatures. Other ways also can be used to form a deposit of finely divided and intimately mixed metals on the alumina support. Multiple impregnations of the aluminas with the metal salt solutions are advantageously used to give higher loadings of metal.

The new catalysts are used advantageously in the purification of 1,3-butadiene-containing feedstocks, in the preparation of butene feedstocks for alkylation and in the preparation of polymer-grade propylene.

In the purification of a 1,3-butadiene feedstock starting with a $C_4$-feed containing 1,3-butadiene, 1,2-butadiene, butenes, acetylenic hydrocarbons such as vinylacetylene, it is now possible to reduce the acetylenic hydrocarbon content to less than 100 p.p.m. and as low as zero, as desired. These and other polyunsaturated hydrocarbon impurities are hydrogenated in the presence of the novel catalysts to form olefines, from which the desired 1,3-butadiene (which is not hydrogenated in the selective reaction) is separated in known manner. In similar fashion, butene feedstocks, desired for alkylation by the petroleum industry, can be prepared in a one-step process wherein acetylene and its homologs, vinylacetylene, 1,2-butadiene, and analogous impurities are hydrogenated in the presence of the novel catalysts to butenes. Also, propylene feedstocks containing propadiene and methyl acetylene impurities can be similarly hydrogenated to transform the impurities to propylene to give a propylene suitable for making polypropylene.

In practice, the desired selective hydrogenations are carried out by passing the indicated and equivalent feedstocks together with about 10 to 100 percent excess hydrogen (over the theoretic stoichiometric hydrogen requirement to convert the highly unsaturated hydrocarbons to olefinic hydrocarbons) over the catalysts of this invention at a space velocity between 400 and 600 hr.$^{-1}$ at a reaction temperature between 140° and 200° C. at a pressure between 1 and 10 atmospheres. The butene and propene feedstocks, if these have been hydrogenated to remove diolefinic and acetylenic impurities are useful as such after hydrogenation. A feedstock from which it is desired to recover 1,3-butadiene, is subjected to an extraction or distillation to recover purified 1,3-butadiene following selective hydrogenation of a crude $C_4$-feed containing 1,3-butadiene and acetylenic and diolefinic impurities. Contaminated or poisoned catalysts can be regenerated by passing air or a mixture of steam and air over the catalysts while they are heated at temperatures between 400° and 600° C. Thereafter, the metal oxides which have been formed are reduced with hydrogen, as previously indicated.

The following examples illustrate specific embodiments of this invention.

*Example 1.—Preparation of Catalyst*

A catalyst consisting of 99.9 weight percent Cu and 0.1 percent Ni in finely divided form on a gamma-alumina carrier (5 percent active metal, 95 percent carrier) was prepared as follows.

A solution was prepared by dissolving with mixing 480 g. cupric acetate monohydrate and 0.48 g. nickel acetate tetrahydrate in sufficient concentrated ammonium hydroxide to make one liter of solution. Gamma alumina aggregates (¼ to 8 mesh, 200 m.$^2$/g.) were dried for several hours at 200° C. to remove the bulk of adsorbed water, then cooled in a dry atmosphere. They were then impregnated with the ammoniacal copper-nickel acetate solution in a clean, dry mixer in proportions of 320 ml. of solution per kg. of alumina. The impregnated alumina was dried at 100° to 120° C. to remove water and ammonia vapors. The dried catalyst was roasted at 300° to 350° C. to decompose the acetates to the oxides. Burning was avoided by recirculating inert gas. Nitrogen dilution can also be used for this purpose. The cooled, roasted catalyst is advantageously stored in polyethylene-lined fiber packs or the like prior to use. The catalyst is heated with steam to 280° C. and reduced with $H_2$ in the presence of steam to keep the reduction temperature at 290° C.

*Example 2.—Selective Hydrogenation of Acetylenic Hydrocarbons in $C_4$-Mixture*

A quantity of $C_4$-hydrocarbon gases (containing hydrogen, ethane, propylene, carbon dioxide, vinylacetylene, 1,3-butadiene, butene-1, butene-2, isobutene, n-butane and isobutane in the proportions indicated below) and hydrogen were metered at constant pressure and thence combined and passed through a bed of basic lead acetate to remove acid sulfides. For the major portion of the run, the gases were then bubbled through water at room temperature and passed into a catalyst bed (95 weight percent kappa alumina and 5 weight percent of copper containing 0.01 percent nickel and 0.01 percent iron) contained in a glass tube 10 cm. long, 12 mm. I.D. having 10 cm. lengths of 6 mm. glass tubing on each end with ground glass connections. The catalyst tube was contained in a cylindric furnace about 20 cm. long, the temperature of which was maintained constant by an electronic controller. Relative hydrogen concentrations of the reactor exit gases were measured by thermal conductivity. Alpha-acetylenes were detected qualitatively by bubbling the exit gas into a small amount of alcoholic silver nitrate solution containing an indicator which changes color when acid is formed due to the formation of silver acetylides or quantitatively by condensing a 10 to 20 gram sample of the gas in a cold trap, weighing and then bubbling into 50 ml. of the silver nitrate solution which is then titrated. Traces of butadiene (0–100 p.p.m.) in the butene-rich stream were measured by ultra-violet absorption. Component balances were obtained by taking simultaneous samples of the stream before and after the reactor which were analyzed by mass spectrometry. Data for this run follow.

Catalyst composition:
  95 weight percent kappa alumina
  5 weight percent Cu containing 0.01 percent Ni and 0.01 percent Fe
Weight of reduced catalyst:
  19.2625 g. (8–20 mesh, 15.3 ml. CO chemisorbed per 100 ml. bulk catalyst)
Flow of $C_4$-stream:
  120 ml./min. (25° C., 1 atm.)
Flow of $H_2$:

3 ml./min. (25° C., 1 atm.)

| Time | Temp., °C. | Remarks |
|---|---|---|
| 0 | 171 | No vinylacetylene in product. |
| 8 min | 160 | Do. |
| 17 min | 140 | Do. |
| 37 min | 130 | Do. |
| 49 min | 120 | Some vinylacetylene in product (ca. 100 p.p.m.). |
| 1 hr. 7 min | 155 | No vinylacetylene in product. |
| 4 hr. 2 min | 150 | Do. |
| 5 hr. 27 min | 150 | Do. |
| 5 hr. 32 min | 150 | Do. |
| 5 hr. 44 min | 150 | Added 75 ml. $N_2$ to feed stream to increase space velocity. Trace of α-acetylenes passing. |
| 5 hr. 44 min | 150 | No $N_2$. No acetylenes in product. |
| 13 hr. 52 min | 150 | No acetylenes in product. |
| 14 hr. 34 min | 150 | Gas samples taken of feed and product. |
| 18 hr. 4 min | 150 | No acetylenes in product. |

Analysis of feed and product gases after 45 hrs. 7 mins. of run showed the following:

| | Feed, vol. percent | Product, vol. percent |
|---|---|---|
| $H_2$ | 3.3 | 0.7 |
| $C_2H_6$ | 0.9 | 1.0 |
| Propylene | 0.3 | 0.3 |
| $CO_2$ | 0.4 | 0.5 |
| Vinylacetylene | [1] 1.1 | [2] 0.009 |
| 1,3-butadiene | 42.3 | 42.5 |
| Butene-1 | 18.6 | 20.9 |
| Butene-2 | 9.1 | 8.5 |
| Isobutene | 14.1 | 15.2 |
| n-Butane | 8.7 | 9.1 |
| Isobutane | 1.4 | 1.4 |

[1] 1.34 by titration of a-acetylenes.
[2] By titration.

*Example 3.—Selective Hydrogenation of Acetylenic Hydrocarbons in $C_4$-Mixture*

The procedure of Example 2 was repeated under the following conditions:
Catalyst composition:
  95.1 weight percent activated alumina,
  4.9 weight percent Cu containing 0.077 percent Ni
Weight of reduced catalyst:
  13.5 g.
Flow of $C_4$-stream:
  120 ml./min. (25° C., 1 atm.)
Flow of $H_2$:
  Ca. 1 ml./min. (25° C., 1 atm.)

| Time | Temp., °C. | Remarks |
|---|---|---|
| 0 | 35 | |
| 10 min | 35 | No acetylenes passing. |
| 20 min | 35 | Do. |
| 50 min | 35 | Some acetylenes passing. |
| 1 hr. 20 min | 68 | Do. |
| 1 hr. 40 min | 120 | Do. |
| 1 hr. 47 min | 145 | No acetylenes passing. |
| 2 hr. 45 min | 144 | Do. |
| 2 hr. 55 min | 141 | Do. |
| 3 hr. 15 min | 141 | Mass spect. samples taken feed 924 product 925. |
| 8 hr. 5 min | 143 | Titration sample 926. |
| 8 hr. 45 min | 143 | Mass spect. samples taken feed 927, product 928. |
| 32 hr. 35 min | 140 | No acetylenes passing. |
| 32 hr. 50 min | 140 | Added 2 vol. percent CO to $H_2$ stream. |
| 33 hr. 5 min | 140 | No acetylenes passing CO upped to 4 vol. percent of $H_2$. |
| 33 hr. 55 min | 140 | Mass spect. samples of feed 929 and product 930. |
| 34 hr. 55 min | 140 | No acetylenes passing. |

Analysis of the indicated samples showed the following:

| | Feed, vol. percent (924) | Product, vol. percent (925) |
|---|---|---|
| Hydrogen | 1.7 | 0.7 |
| Propylene | 2.1 | 2.0 |
| $CO_2$ | 0.09 | 0.09 |
| 1,3-butadiene | 29.4 | 28.8 |
| Butene-1 | 26.0 | 27.7 |
| Butene-2 | 16.2 | 15.6 |
| Isobutene | 22.6 | 23.1 |
| n-Butane | 1.5 | 1.5 |
| Isobutane | 0.40 | 0.41 |
| Butadiene dimer | 0.06 | 0.06 |
| Vinyl- and ethylacetylene | 0.148 | [1] Nil |

| | Feed, vol. percent (927) | Product, vol. percent (928) |
|---|---|---|
| Hydrogen | 1.5 | 0.6 |
| Propylene | 1.9 | 1.8 |
| $CO_2$ | 0.1 | 0.09 |
| 1,3-butadiene | 29.7 | 28.9 |
| Butene-1 | 27.2 | 28.3 |
| Butene-2 | 14.4 | 16.6 |
| Isobutene | 23.3 | 21.5 |
| n-Butane | 1.4 | 1.5 |
| Isobutane | 0.37 | 0.38 |
| Butadiene dimer | 0.08 | 0.30 |
| Vinyl- and ethylacetylenes | 0.148 | [2] Nil |

| | Feed, vol. percent (929) | Product, vol. percent (930) |
|---|---|---|
| Hydrogen | 1.6 | 0.9 |
| CO | 0.06 | |
| Propylene | 1.7 | 1.8 |
| $CO_2$ | 0.1 | 0.08 |
| 1,3-butadiene | 29.8 | 29.2 |
| Butene-1 | 32.0 | 29.8 |
| Butene-2 | 11.0 | 14.1 |
| Isobutene | 21.8 | 22.1 |
| n-Butane | 1.2 | 1.4 |
| Isobutane | 0.57 | 0.54 |
| Butadiene dimer | 0.06 | 0.16 |
| Vinyl- and ethylacetylenes | 0.148 | [2] Nil |

[1] Less than 5 p.p.m. 926.
[2] Less than 5 p.p.m.

The presence of CO depressed the hydrogenation of 1,3-butadiene but did not reduce the catalyst efficacy for the selective hydrogenation of α-acetylene.

Copper metal promoted with 0.01 to 0.1 weight percent of Ni, Pd, Ru, or Pt and supported on activated gamma alumina has now been found to be a very selective hydrogenation catalyst for 1,3-butadiene in the presence of butenes. This process is of interest to the petroleum industry for cleaning up the feed streams to alklation units.

*Example 4.—Selective Hydrogenation of Diolefines and Acetylene in the Presence of Monoolefines*

The apparatus and technique described in Example 2 were used to clean up a $C_4$-stream for alkylation usage.

Catalyst composition:
    95.1 weight percent mixed activated gamma alumina
    4.9 percent copper containing 0.077 percent Ni (1.07 ml. CO chemisorbed per g. catalyst)

Weight of reduced catalyst:
    12.6909 g.

Flow of $C_4$-stream:
    120 ml./min. (25° C., 1 atm.)

Flow of $H_2$ stream:
    2 ml./min. (25° C., 1 atm.)

| Time | Temp., ° C. | Remarks |
|---|---|---|
| 0 | 130 | |
| 35 min | 132 | Vapor phase chromatogram showed 1,3-butadiene. |
| 85 min | 174 | |
| 140 min | 173 | No butadiene by U. V. absorption. |
| 175 min | 173 | Do. |
| 195 min | 173 | Mass spec. samples. |
| 220 min | 173 | No butadiene by U. V. absorption. |
| 3 hr. 10 min | 173 | |
| 8 hr. 40 min | 173 | Increased space velocity by adding 100 ml. N₂/min. Butadiene in product, 25 p.p.m. |
| 24 hr. 10 min | 168 | |
| 24 hr. 55 min | 168 | No butadiene in product. |
| 26 hr | 168 | Do. |
| 27 hr. 20 min | 168 | Do. |
| 27 hr. 50 min | 168 | Do. |
| 31 hr. 50 min | 168 | Do. |
| 32 hr | 168 | Addition of 75 ml./N₂ min. |
| 32 hr. 45 min | 168 | Butadiene in product, 25 p.p.m. |

Analytic data:

| | Feed, vol. percent | Product, vol. percent |
|---|---|---|
| Hydrogen | 1.8 | 0.5 |
| Propylene | 0.5 | 0.4 |
| Vinylacetylene | 0.1 | [1] Nil |
| 1,3-butadiene | 1.1 | [2] Nil |
| Butene-1 | 1.2 | 4.9 |
| Butene-2 | 63.3 | 61.4 |
| n-Butane | 31.9 | 32.8 |
| Butene-content ($H_2$-free basis) | 65.68 | 66.63 |

[1] Less than 5 p.p.m. by titration.
[2] Less than 3 p.p.m. by U. V. absorption.

The gain in butenes resulted from the selective hydrogenation of 1,3-butadiene and vinylacetylene to butenes.

*Example 5.—Selective Hydrogenation of Diolefines and Acetylene in the Presence of Monoolefines*

The apparatus and technique of Example 2 were utilized with the same flow conditions as in Example 4, using as catalyst composition 13.0018 g. of 95 weight percent mixed activated gamma alumina, 5 weight percent copper containing 0.1 percent Pd. After a 3 hr. 35 min. run wherein temperatures were varied between 50° and 154° C. to observe temperature effects, feed and product samples (taken after reaction at 150° C.) for mass spectrometry showed the following:

| | Feed, vol. percent | Product, vol. percent |
|---|---|---|
| Hydrogen | 1.9 | 0.4 |
| Propylene | 0.5 | 0.4 |
| Vinylacetylene | 0.09 | [1] Nil |
| 1,3-butadiene | 1.1 | [2] Nil |
| Butene-1 | 3.6 | 6.0 |
| Butene-2 | 60.5 | 60.3 |
| n-Butane | 32.2 | 32.9 |
| Butene-content ($H_2$-free basis) | 65.34 | 66.57 |

[1] Less than 5 p.p.m. by titration.
[2] 1–5 p.p.m. by U. V. absorption.

*Example 6.—Selective Hydrogenation of Acetylene in the Presence of Monoolefines*

The apparatus and technique of Example 2 were utilized with the same flow conditions as in Example 4, using as a catalyst composition 15.5794 g. of 96 weight percent mixture of activated gamma alumina with 4 percent copper containing 0.066 weight percent Ru. After a 7 hr. 5 min. run during which reaction temperature was varied between 114° and 154° C., samples of feed and product of reaction at 154° C. showed the following.

| | Feed, vol. percent | Product, vol. percent |
|---|---|---|
| Hydrogen | 1.8 | 0.7 |
| Propylene | 0.2 | 0.2 |
| $CO_2$ | 0.2 | 0.3 |
| Vinylacetylene | 0.06 | Nil |
| 1,3-butadiene | 1.1 | Nil |
| Butene-1 | 3.5 | 5.6 |
| Butene-2 | 60.8 | 60.6 |
| n-Butane | 32.3 | 32.6 |
| Butene-content ($H_2$-free basis) | 65.48 | 66.66 |

The catalyst was prepared by dissolving 18.8283 g. $Cu(CH_3COO)_2$—$H_2O$ and 0.090 g. $RuNOCl_3$ in concentrated $NH_4OH$ to make 50.0 ml. solution. Twenty grams of dried activated gamma alumina was impregnated with 6.4 ml. of catalyst solution. The impregnated support was dried at 120° C. for 2 hrs., roasted at 350° C. for 3 hrs. and reduced at 290° C. with $N_2$—$H_2$ mixture.

*Example 7.—Selective Hydrogenation of Methylacetylene and Propadiene in Propylene*

The apparatus and technique of Example 2 were utilized in cleaning up a $C_3$-hydrocarbon stream to give polymer grade propylene, as follows:

Catalyst composition:
    95.1 weight percent mixed activated gamma alumina with 4.9 weight percent Cu containing 0.077 weight percent Ni (1.07 ml. CO chemisorbed per g. catalyst)

Weight of reduced catalyst:
    12.6853 g.

Flow of $C_3$-stream:
    120 ml./min. (25° C., 1 atm.)

Flow of $H_2$ stream:
    Ca. 2.5 ml./min. (25° C., 1 atm.)

| Time | Temp., ° C. | Remarks |
|---|---|---|
| 0 | 65 | |
| 2 min | 70 | |
| 10 min | 116 | No methylacetylene passing. |
| 25 min | 118 | |
| 1 hr. 30 min | 117 | Mass spect. samples taken. |
| 2 hr. 25 min | 146 | |
| 3 hr. 35 min | 170 | No methylacetylene passing. |
| 5 hr. 35 min | 170 | Do. |
| 7 hr. 35 min | 170 | Do. |
| 8 hr. 35 min | 170 | Do. |
| 10 hr. 35 min | 170 | Do. |

| | Feed, vol. percent | Product vol. percent |
|---|---|---|
| Hydrogen | 2.5 | 0.9 |
| Ethylene | 0.5 | 0.2 |
| Ethane | 4.8 | 5.4 |
| Propadiene and/or methylacetylene | [1] 0.4 | [2] Nil |
| Propylene | 89.8 | 89.9 |
| Propane | 1.6 | 3.1 |

[1] By titration 0.156% methylacetylene.
[2] Less than 5 p.p.m. methyl acetylene by titration.

Considerable excess $H_2$ was used in the above run to assure the hydrogenation of propadiene.

In each run, excess hydrogen was used, advantageously between 10 and 100 percent excess over the demands of the hydrogenation reaction desired. As compared with the known promoted copper catalysts supported on a siliceous carrier, the copper catalysts of this invention, supported on alumina carriers, are useful at space velocities more than twice that of the known copper catalysts for the same types of hydrogenations. They also remove acetylenes to leave much less than 100 p.p.m. to nil, as desired, and make possible the cleaning up of $C_4$- and $C_3$-hydrocarbon feedstocks to give alkylation grade butenes and polymer grade propylene, respectively.

What is claimed is:

1. Method of selectively hydrogenating a polyunsaturated hydrocarbon of the diolefinic and acetylenic types in the presence of monoolefines which comprises passing a hydrocarbon feed of the $C_4$- and $C_3$-types containing said vaporized hydrocarbons together with at least the theoretic amount of hydrogen to reduce the desired polyunsaturated hydrocarbon to an olefine over a granular catalyst consisting of between 99.9 and 99.999 weight percent of finely divided copper, the balance being at least one finely divided metal of the group Fe, Ni, Ru, Rh, Pd, Ir and Pt, said metals being dispersed on at least one high surface area carrier of the group activated gamma alumina and kappa alumina at a reaction temperature between about 140° and 200° C.

2. A method for obtaining a 1,3-butadiene feedstock which comprises selectively hydrogenating a $C_4$-hydrocarbon feed containing 1,3-butadiene in admixture with acetylenic and diolefinic hydrocarbon impurities to reduce said hydrocarbon impurities to olefines without substantially hydrogenating any 1,3-butadiene, which comprises passing the vaporized $C_4$-hydrocarbon feed, together with at least the theoretic amount of hydrogen to reduce the acetylenic and diolefinic hydrocarbon impurities to olefines but not sufficient to reduce substantially any 1,3-butadiene, over a granular catalyst consisting of between 99.9 and 99.999 weight percent of finely divided copper, the balance being at least one finely divided metal of the group consisting of Fe, Ni, Ru, Rh, Pd, Ir and Pt, said metals being dispersed on at least one high surface area carrier of the group consisting of activated gamma alumina and kappa alumina while heating the vapors at a reaction temperature between about 140° and 200° C.

3. A method for obtaining a butylene feedstock which comprises selectively hydrogenating a $C_4$-hydrocarbon feed containing at least one impurity of the group consisting of 1,3-butadiene, vinylacetylene and ethylacetylene to reduce said impurities to butylenes which method comprises passing the vaporized $C_4$-hydrocarbon feed together with at least the theoretic amount of hydrogen to reduce the impurities to butylenes over a granular catalyst consisting of between 99.9 and 99.999 weight percent of finely divided copper, the balance being at least one finely divided metal of the group consisting of Fe, Ni, Ru, Rh, Pd, Ir and Pt, said catalyst being dispersed on at least one high surface area carrier of the group consisting of activated gamma alumina and kappa alumina while heating the vapors at a reaction temperature between about 140° and 200° C.

4. A method for obtaining a propylene feedstock which comprises selectively hydrogenating a $C_3$-hydrocarbon feed containing at least one impurity of the group consisting of propadiene and methylacetylene to reduce said impurities to propylene which method comprises passing the vaporized $C_3$-hydrocarbon feed together with at least the theoretic amount of hydrogen to reduce the impurities to propylene over a granular catalyst consisting of between 99.9 and 99.999 weight percent of finely divided copper, the balance being at least one finely divided metal of the group consisting of Fe, Ni, Ru, Rh, Pd, Ir and Pt, said metals being dispersed on at least one high surface area carrier of the group consisting of activated gamma alumina, and kappa alumina, while heating the vapors at a reaction temperature between about 140° and 200° C.

References Cited in the file of this patent

UNITED STATES PATENTS

| 2,426,604 | Frevel | Sept. 2, 1947 |
| 2,451,327 | Fasce et al. | Oct. 12, 1948 |
| 2,580,284 | Deahl et al. | Dec. 25, 1951 |
| 2,735,879 | Redcay | Feb. 21, 1956 |
| 2,742,437 | Houdry | Apr. 17, 1956 |
| 2,802,889 | Frevel et al. | Aug. 13, 1957 |
| 2,927,141 | Cohn et al. | Mar. 1, 1960 |

OTHER REFERENCES

Rosin: Reagent Chemicals and Standards, D. Van Nostrand Company, Inc., New York, 3rd ed., 1955, pp. 143 and 148.